April 5, 1966 R. MONTESI 3,244,439
REUSABLE SWIVEL HOSE COUPLING
Filed May 7, 1964
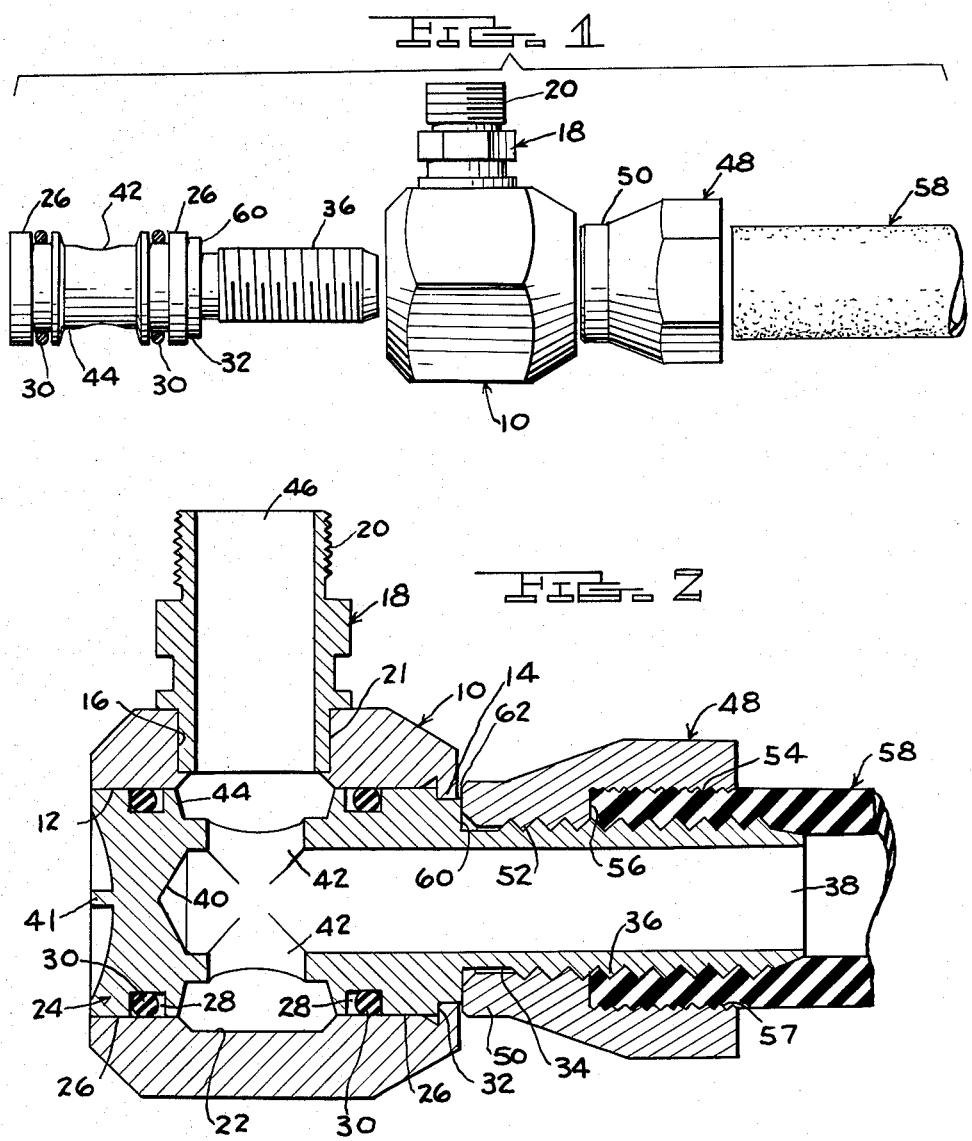
INVENTOR
ROBERT MONTESI
Barnes, Kisselle, Raisch & Choate
ATTORNEYS

United States Patent Office 3,244,439
Patented Apr. 5, 1966

3,244,439
REUSABLE SWIVEL HOSE COUPLING
Robert Montesi, Detroit, Mich., assignor to Hydralink Corporation, Warren, Mich., a corporation of Michigan
Filed May 7, 1964, Ser. No. 365,749
3 Claims. (Cl. 285—174)

This invention relates to hose couplings, and more particularly to a hose coupling of the swivel type that is designed so that a hose can be securely attached thereto or removed therefrom so as to make the coupling reusable.

It is an object of the present invention to provide a hose coupling of the type described which is of simple construction, economical to manufacture and easily assembled to provide a fluid-tight connection.

In the drawings:

FIG. 1 is an exploded side elevational view of the hose coupling of the present invention.

FIG. 2 is a vertical sectional view of the hose coupling of the present invention illustrating one end of a hose attached thereto.

The hose coupling of the present invention includes a body 10 which is preferably formed from hexagonal bar stock. Body 10 is formed with an axially extending through bore 12 which at one end of the body is ensmalled by a radially inwardly extending annular rib or shoulder 14. Body 10 is also fashioned with a radially extending bore 16 which intersects bore 12. Bore 16 is adapted to receive a fitting 18 which is threaded as at 20 for connection to a device for supplying fluid under pressure to the fitting. On the other hand, the fitting 18 may be adapted for connection as at 20 to a device such as a grease gun, through which the hydraulic fluid is to be discharged from the coupling. In the arrangement illustrated, fitting 18 is formed from hexagonal bar stock and the inner end thereof is formed as a cylindrical surface 21 sweated in bore 16. Fitting 18 may, however, be secured to body 10 by any other suitable means, such as by a threaded connection therewith to provide a fluid-tight connection with body 10. At the area of the junction between bores 16 and 12, body 10 is fashioned with an annular groove 22.

Within the bore 12 there is arranged a stem 24 which is fashioned with a pair of spaced cylindrical surfaces 26 having a close fit with the cylindrical surface of bore 12 adjacent its opposite ends. Each cylindrical surface 26 is formed with an annular groove 28 in which there is arranged an O-ring 30 which forms a seal between the stem 24 and the bore 12 of body 10. The outer periphery of stem 24 is formed with a shoulder 32 adjacent one of the cylindrical surfaces 26, which is designed to abut against the shoulder 14. Adjacent the shoulder 32 the outer diameter of stem 24 is further reduced as at 34, the reduced portion being internally threaded as at 36. Stem 24 is formed with an axially extending bore 38 which terminates as at 40. The end face of stem 24 is provided with screwdriver slots 41. The portion of stem 24 registering with fitting 18 is formed with a plurality of radial openings 42. Between the cylindrical surfaces 26 of stem 24 the outer peripheral surface of stem 24 is fashioned with an annular groove 44 which registers axially with the annular groove 22 in body 10. With this arrangement, it will be observed that by reason of the annular groove 22, 44 and the openings 42 in stem 24, the passageway 46 in fitting 18 is in constant communication with the bore or passageway 38 in stem 24. It will also be observed that in view of the uniform diameter of bore 24 and the symmetrical arrangement of seals 30, the coupling is of the balanced pressure type.

The coupling assembly is completed by a sleeve 48 which is also preferably formed from hexagonal bar stock. The outer surface of sleeve 48 is reduced at one end thereof as at 50. Sleeve 48 is internally threaded at the smaller end thereof as at 52, and is counterbored at the larger end thereof as at 54. The counterbore 54 terminates in a square shoulder 56. In installations where the coupling is used in conjunction with high pressure conduits, counterbore 54 may be threaded as at 57.

The fitting illustrated in the drawing is designed to be connected to the end of a hose in the following manner: Assuming that the fitting 18 is suitably secured to the body 10, then the stem 24 is inserted axially into the bore 12 of the body from the larger end thereof to the position illustrated in FIG. 2, wherein the threaded portion 36 of the stem projects axially outwardly of the body and the shoulder 32 on stem 24 abuts and engages with shoulder 14 on body 10. Thereafter the end portion of a hose 58 is inserted in the counterbore 54 of sleeve 48. Counterbore 54 is dimensioned so that the hose will fit snugly therein. After the hose 58 is inserted into the counterbore 54 with its end abutting against the square shoulder 56, the assembly of the sleeve 48 and the hose 58 is threaded onto the threaded end 36 of stem 24. The screwdriver slots 41 in the stem 24 may be utilized for turning stem 24. However, the threaded connection of stem 24 with sleeve 48 and hose 58 can also be effected by rotating stem 24 and body 10 as a unit. This latter operation is facilitated by the fact that the openings 42 in stem 24 register with the passageway 46 in fitting 18, thus enabling a screwdriver or other tool to be inserted through fitting 18 and openings 42 to interlock body 10 and stem 24 against relative rotation. Thus, the stem and body can be rotated as a unit to thread sleeve 48 and hose 58 over the threaded portion 36 of stem 24. It will be observed that the inner diameter of hose 58 is dimensioned such that the threads on the stem 24 bite or cut into the inner surface of the hose so as to squeeze the hose between the threaded portion 36 of the stem and the threaded or unthreaded counterbore 54. This provides a very secure and fluid-tight connection between the hose and stem 24. Sleeve 48 is threaded on stem 24 to a position wherein the reduced end 50 abuts against the end face 60 on stem 24 at the junction of the reduced portion of the stem with the larger portion thereof. Thus the sleeve 48 retains the several members of the swivel hose coupling in assembled relation. It will be observed that there is a clearance space 62 of a few thousandths of an inch between the end face of sleeve 48 and the adjacent end face of body 10. In this connection note also that the outer diameter of the reduced end 50 of sleeve 48 is larger than the opening in body 10 defined by the annular rib 14.

As is clear from the drawing and the description preceding, it is essential that for the purpose of rendering the coupling reusable, hose 58 must be attached to the coupling in a liquid-tight manner, but in a manner that permits disconnecting the hose without destroying either stem 24 or sleeve 48. In the embodiment illustrated, threads 36, 54 are provided for this purpose, and such an arrangement is preferred from the standpoint of simplicity of operation and economy. However, means other than threads may be utilized for removably connecting hose 58 with stem 24 and sleeve 48 with a fluid-tight joint. Friction and lock wedge joints for this purpose are conventional in this art, especially with hoses covered with wire braid or rubber-covered wire braid.

Since the end of the hose 58 is at all events compressed between stem 24 and the counterbore 54 of sleeve 48, it will be appreciated that the hose serves in the nature of a lock washer for sleeve 48, and there is no tendency for the sleeve 48 to become accidentally loosened relative to the stem. In addition, it will be observed that when it is desired to remove the hose 58 from the coupling, it is merely necessary to hold sleeve 48 against turning and to turn the threaded portion 36 of stem 24 out of this sleeve and hose either by inserting a turning tool such as a screwdriver through fitting 18 and the openings 42 registering therewith or by utilizing a screwdriver in slots 41.

I claim:

1. A reusable swivel hose coupling comprising a body having a bore extending axially therethrough from one end to the other, said bore having a larger diameter portion provided with a pair of axially spaced, circular cylindrical portions with an opening therebetween, a fitting mounted on said body and having a passageway therein communicating with said opening, said bore having a smaller diameter portion at one end connected with the larger diameter portion by means of a radially extending shoulder, a stem having a larger diameter portion disposed within the larger diameter bore portion of the body and a reduced portion extending through the smaller diameter portion and out through the adjacent end of the body, said one portion of the stem having a pair of axially spaced circular cylindrical portions registering axially with the circular cylindrical portions of the larger diameter bore, O-rings at said cylindrical portions rotatably sealing said stem in said bore, said stem having an axial bore which is closed at the end thereof within said larger diameter bore and open at the other end of the reduced portion, said stem having a transverse opening therein between said O-rings establishing communication between the passageway in the fitting and the bore in the stem, the reduced portion of the stem which projects outwardly of the body being externally threaded, a sleeve threaded over the threaded portion of the stem and having one end engaging shoulder means on said stem and radially overlapping said shoulder means to limit axial movement of the stem in one direction on said body, the portion of said stem within the larger diameter bore engaging the radially extending shoulder on the body to limit axial movement of the stem in the opposite direction on said body, the opposite end of said sleeve having a bore therein which is spaced radially outward from the threaded portion of said stem, and a hose member frictionally retained in a compressed state between the threaded portion of the stem and the surface of the bore in said sleeve.

2. A hose coupling as called for in claim 1 wherein the shoulder means on the stem comprises a first reduced cylindrical portion disposed within said smaller diameter bore and having an axial extent slightly greater than the axial extent of the smaller diameter bore and a second further reduced cylindrical portion contiguous to the first reduced portion for receiving said sleeve.

3. A hose coupling as called for in claim 1 wherein said shoulder means comprises a pair of radially extending annular faces on the stem spaced axially apart a distance slightly greater than the axial extent of the smaller diameter bore and connected by a cylindrical surface extending through the small diameter bore, one of said faces abutting the shoulder in said bore, said one end of the sleeve abutting the other of said radially extending faces and having an outer diameter greater than the diameter of the smaller bore.

References Cited by the Examiner

UNITED STATES PATENTS

| 1,889,980 | 12/1932 | Farley | 285—174 X |
| 2,400,658 | 5/1946 | Shepherd | 285—190 |
| 2,459,643 | 1/1949 | Hartley | 285—190 |
| 2,565,791 | 8/1951 | Wagner et al. | 285—190 X |
| 2,571,012 | 10/1951 | Coats | 285—190 X |
| 3,088,759 | 5/1963 | Corsette | 285—190 X |
| 3,125,360 | 3/1964 | Ulrich | 285—190 X |
| 3,177,016 | 4/1965 | Holmgren | 285—247 |

FOREIGN PATENTS

| 539,921 | 4/1957 | Canada. |
| 502,638 | 3/1939 | Great Britain. |

CARL W. TOMLIN, *Primary Examiner.*

THOMAS F. CALLAGHAN, *Examiner.*